July 21, 1964 L. V. GEWISS 3,141,220
CLAMPING COLLARS
Filed Jan. 15, 1959 2 Sheets-Sheet 1

INVENTOR
Lucien Victor Gewiss

BY Lane, Aitken & Dunner
ATTORNEY

July 21, 1964  L. V. GEWISS  3,141,220
CLAMPING COLLARS

Filed Jan. 15, 1959  2 Sheets-Sheet 2

INVENTOR
Lucien Victor Gewiss

BY Lane, Aitken e Dunner
ATTORNEY

United States Patent Office 3,141,220
Patented July 21, 1964

3,141,220
CLAMPING COLLARS
Lucien Victor Gewiss, Ville-d'Avray, France, assignor to Marc Wood Societe Anonyme pour la Promotion des Echanges Techniques Internationaux, Paris, France, a French company
Filed Jan. 15, 1959, Ser. No. 787,049
Claims priority, application France Jan. 30, 1958
4 Claims. (Cl. 24—283)

The present invention has for its object improvements in clamping collars adapted to secure more or less yielding cylindrical pipes or the like parts over rigid members of a similar shape.

Collars of this type which have been designed and executed hitherto are generally constituted by a yielding blade of which the ends are interconnected by a screw of a clamping bolt, but they have the serious drawback consisting in that they do not provide a sufficient fluidtightness, chiefly when it is desired to secure over metal mouth-pieces of tubular members made of certain semi-rigid plastic substances such as nylon, rilsan or the like. The peripheral clamping obtained thereby is, as a matter of fact, too low per unit of surface and chiefly its distribution lacks uniformity so that it cannot consequently deform and tighten sufficiently the plastic material considered and the joint obtained cannot oppose the tendency to leaking when substantial increases and reductions in pressure are applied in registry with said joint.

The present invention has for its object an improved clamping collar, the operation of which is more satisfactory from this standpoint than all prior collars. Said improved collar is chiefly constituted by two strands of a metal wire which is comparatively fine but highly resistant, said strands being wound into an arcuate shape so as to form each at least two substantially parallel convolutions, while the ends of the strands are attached to two terminal metal members adapted to be urged towards each other through the operation of a screw engaging both members.

Thus, the winding of each wire strand through at least two convolutions without any lack of continuity and without any overlapping ensures, when the two terminal members are urged together under the action of the screw connecting same, an uninterrupted peripheral clamping over an arc of at least twice 360°, taking into account the room occupied by the terminal members and the gap separating same, so that the reliability obtained through this clamping is doubled by the use of two wire strands extending side by side.

The screwing of the screw into the terminal members allows exerting a peripheral stress as large as may be required with only the resistance of the wires defining a practical limit for the clamping stress. A selection of suitable metals and chiefly of treated steel for the wire allows in fact shifting said limit considerably beyond the pressure per surface unit which is generally required for obtaining a satisfactory fluidtightness. This is the case in particular when, in accordance with a further feature of the invention, the metal wire has a circular cross-section with a small diameter, since in such a case the pressure is exerted on a surface reduced theoretically to a line and, at any rate in practice, to a very small area.

In an embodiment of the invention, the two wire strands forming the collar may be constituted by a single wire section folded over itself substantially round the middle of its length or again by two separate wire sections of equal lengths.

The terminal members may be constituted by cylindrical or preferably prismatic barrels provided each with a medial transverse tapped opening engageable by the clamping screw and furthermore with slots or holes inside which the free ends of the wire strands may be fitted through looping, wedging, welding or the like suitable methods.

The following detailed description will allow readily understanding the execution of the invention, reference being made to the accompanying drawings, wherein.

Figure 1:
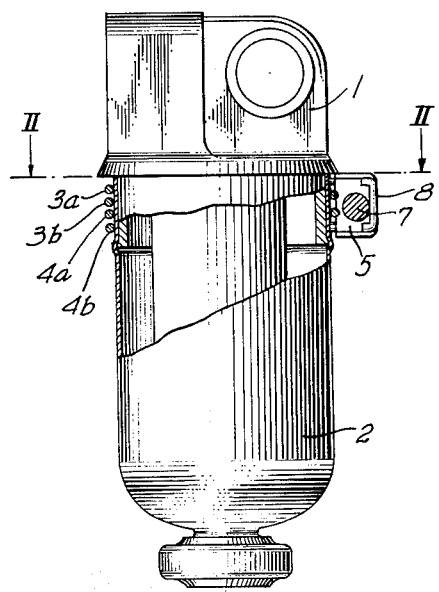
FIG. 1 is an elevational partly sectional view of a decanting filter associated with a collar according to the invention for the clamping of a nylon vat onto the head of the filter.
Figure 2:
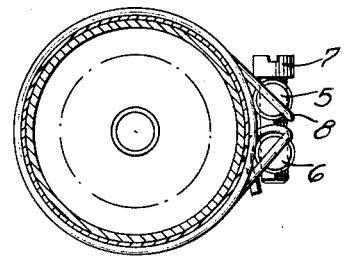
FIG. 2 is a horizontal cross-section through line II—II of FIG. 1.

In the example illustrated in FIGS. 1 and 2, 1 designates the head of the settling filter onto which a nylon vat 2 is to be fitted and secured fluidtightly through clamping. Said clamping is ensured by a collar according to the invention, which collar includes two strands of a fine wire, said strands being wound so as to form respectively two convolutions 3a, 3b and 4a, 4b, the ends of said strands being fitted in the two barrels 5 and 6 adapted to be urged towards each other by a screw 7 passing through them. In the example illustrated and as clearly apparent from inspection of FIG. 3, the two wire strands are constituted by a single common wire section of which the medial bent section forms a closed loop 8 fitted inside slots 5a and 5b cut across the ends of the barrel 5 and the free ends of which form two loops 9a and 9b which are held fast in the slots 6a and 6b cut across the ends of the barrel 6, the ends of said loop being turned inwardly of the collar.

Figure 4:
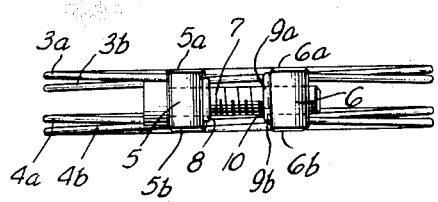
FIGS. 4 and 5 are respectively a partial elevational view and a partial plan view of a modified embodiment of the collar.
Figure 5:
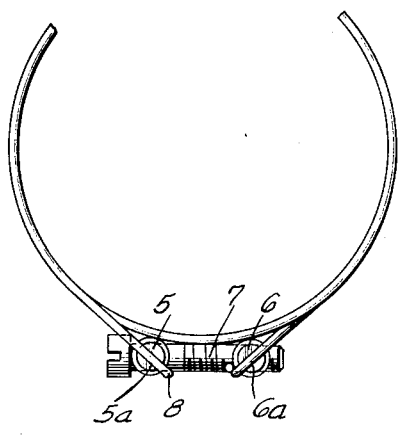

In the modification illustrated in FIGS. 4 and 5, the two strands of the double wound wire forming the collar are constituted as in the preceding example by a single wire section, the medial folded part of which forms a closed loop 8 fitted in the slots 5a and 5b formed across the ends of the barrel 5; but the free ends 9a and 9b are welded together at 10 after they have been fitted inside the slots 6a and 6b cut across the ends of the barrel 6.

Figure 3:
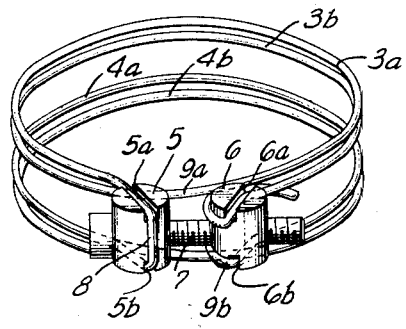
FIG. 3 is a perspective view of the same collar separated from the vat.
Figure 6:
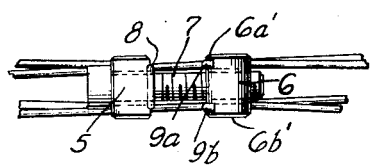
FIGS. 6 and 7 are similar partial views of another modification.
Figure 7:
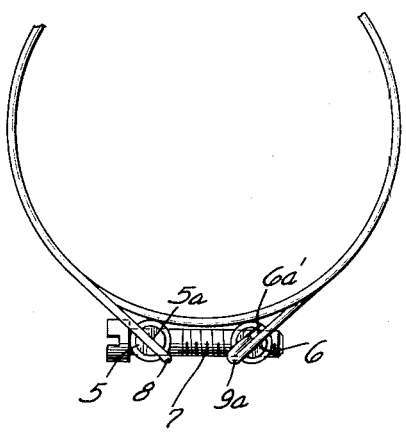

The embodiment according to FIGS. 6 and 7 is similar to that of FIG. 3, but the free ends of the single wire section forming the collar are folded over themselves and are fitted by wedging inside the slots 6a' and 6b' cut across the two ends of the barrel 6.

Figure 8:
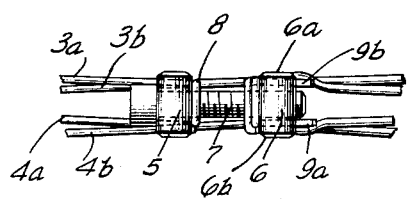
FIGS. 8 and 9 and FIGS. 10 and 11 are similar partial views of two further modifications, respectively.
Figure 9:
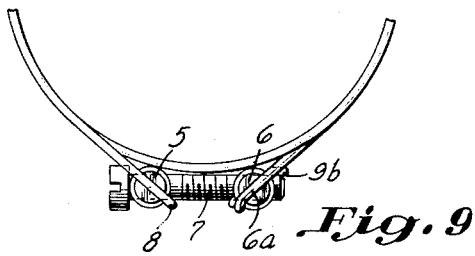

The embodiment of FIGS. 8 and 9 is also similar to that of FIG. 3 with the difference however that the free ends 9a and 9b of the single wire section, which are engaged as precedingly inside the slots 6a and 6b cut across the ends of the barrel 6, cross each other alongside the latter and reengage respectively the second slot, respectively 6b and 6a.

Figure 10:
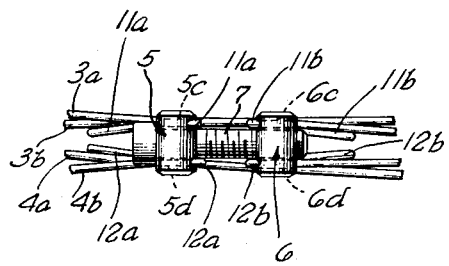
Figure 11:
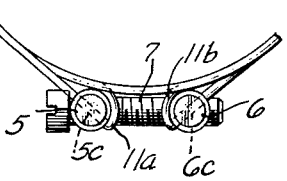

In the modification illustrated in FIGS. 10 and 11, the two double wound wire strands 3a, 3b and 4a, 4b constituting the collar are formed by two separate wire sections. The convolutions 3a and 3b are formed by a first wire the ends 11a and 11b of which engage oblique openings 5c, 6c formed diametrically in the barrels 5 and 6. The convolutions 4a and 4b are formed by a second wire the ends 12a and 12b of which engage other oblique openings 5d, 6d formed in the barrels 5 and 6.

Figure 12:
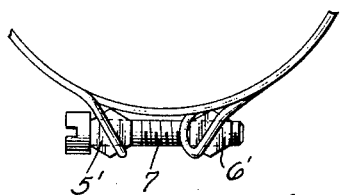
FIG. 12 is a partial plan view of a collar incorporating a modification of the terminal barrels.

In the different embodiments illustrated in FIGS. 1 to 11, the barrels 5 and 6 forming the terminal members for the collar are cylindrical. They may also advantageously be constituted by prismatic members having for instance a hexagonal cross-section, as partly illustrated at 5', 6' in FIG. 12. As a matter of fact, this last shape appears as capable of ensuring a better sliding of the barrels during the clamping of the collar.

Furthermore, instead of being constituted by a single-thread screw, such as that illustrated at 7 in the different examples illustrated, the clamping screw may be constituted by a double screw carrying two threads of opposite pitches screwed respectively inside the barrels 5 and 6 while a medial expansion is provided between said two threads, which expansion may show openings for engagement by an actuating rod.

I all cases and as mentioned hereinabove, the improved collar according to the invention allows obtaining an energetic clamping which is distributed in a remarkably uniform manner throughout the periphery of the tubular member to be held fast.

It should be remarked from this standpoint that the clamping obtained shows no weak point, since both fluid-tight lines corresponding to the two wire strands forming the collars are continuous throughout a peripheral length which is almost equal to two complete revolutions. Furthermore, at a point diametrically opposed to the clamping screw 7, the four wire convolutions may be advantageously closed together so as to be practically in joining relationship at said point as apparent from inspection of the sectional portion of FIG. 1.

When used in this specification or claims, the terms "cylindrical" and "cylinder" are to be construed to embrace structures which are respectively substantially cylindrical and substantially a cylinder.

What I claim is:

1. A clamping collar for tightly securing a cylindrical sheath concentrically about a rigid cylindrical member comprising a pair of clamping band sections; each clamping band section being comprised of a helically arranged band having at least one complete convolution for completely encircling and peripherally engaging said cylindrical sheath; each of said helically arranged bands having two terminal portions; a pair of spaced terminal cylindrical clamping members each of which has a central portion and an end portion on either side of said central portion; said central portion and end portions of each of said clamping members being substantially in alignment in a direction parallel to the axes of said clamping band sections; one of the terminal portions of each of said helically arranged bands being secured to opposite end portions of one of said clamping members at a point substantially coincident with the longitudinal axis of the latter; the other of the terminal portions of each of said helically arranged bands being secured to the opposite end portions of the other of said clamping members at a point substantially coincident with the longitudinal axis of the latter; each of the terminal portions of said clamping band sections extending outwardly substantially tangentially to its respective convolution along a longitudinally extending medial plane of one of said clamping members and being attached to said clamping member in that position, each of said terminal portions being substantially linear from the point of tangency to said convolutions at least up to and including its point of attachment to its respective clamping member; said clamping members having their longitudinal axes parallel to the axes of said clamping band sections and lying against said complete convolutions in said clamping band sections when said clamping collar is in clamping position about said sheath and cylindrical member; and means connected to each of said clamping members for urging the latter towards one another and for drawing said band sections into clamping relationship with the associated cylindrical sheath and rigid member through the application of a force on said central portion of each of said clamping members.

2. A clamping collar as defined in claim 1 wherein said terminal clamping members are provided with transverse throughways inside which said terminal portions of said clamping band sections are positioned.

3. A clamping collar as defined in claim 2 wherein said throughways are located in planes which are substantially tangent to said convolutions.

4. A clamping collar for tightly securing a cylindrical sheath concentrically about a rigid cylindrical member comprising a pair of clamping band sections; each clamping band section being comprised of a helically arranged band having at least one complete convolution for completely encircling and peripherally engaging said cylindrical sheath; each of said helically arranged bands having two terminal portions; a pair of spaced terminal clamping cylinders having their longitudinal axes parallel to the axes of said clamping band sections; one of the terminal portions of each of the helically arranged bands being attached to one of said cylinders and the other of each of said terminal portions of said bands being attached to the other of said cylinders; each of said terminal portions extending substantially tangentially to its respective convolution and being substantially linear from the point of tangency to said convolution at least up to and including its point of attachment to its respective cylinder; said cylinders lying against said complete convolutions in said clamping band sections when said clamping collar is in clamping position about said sheath and rigid member; and means connected to each of said terminal clamping members for urging the latter towards one another and for drawing said band sections into clamping relationship with the associated cylindrical sheath and rigid member.

References Cited in the file of this patent

UNITED STATES PATENTS

| 492,855 | Weidaw | Mar. 7, 1893 |
| 1,359,229 | Cacadier | Nov. 16, 1920 |
| 1,529,979 | Williams | Mar. 17, 1925 |
| 2,561,635 | Prochaska | July 24, 1951 |

FOREIGN PATENTS

| 257,898 | Great Britain | Dec. 16, 1926 |
| 448,348 | Great Britain | June 8, 1936 |
| 894,044 | France | Mar. 6, 1944 |